(12) United States Patent
Abbott et al.

(10) Patent No.: US 11,378,173 B2
(45) Date of Patent: Jul. 5, 2022

(54) SYSTEMS AND METHODS FOR ABATEMENT OF GEAR RATTLE BY LINEAR DEFLECTION

(71) Applicant: Muncie Power Products, Inc., Muncie, IN (US)

(72) Inventors: James R. Abbott, Muncie, IN (US); Thomas W. Funk, Collinsville, OK (US)

(73) Assignee: Muncie Power Products, Inc., Muncie, IN (US)

( * ) Notice: Subject to any disclaimer, the term of this patent is extended or adjusted under 35 U.S.C. 154(b) by 6 days.

(21) Appl. No.: 16/931,795

(22) Filed: Jul. 17, 2020

(65) Prior Publication Data

US 2021/0018084 A1    Jan. 21, 2021

Related U.S. Application Data

(60) Provisional application No. 62/876,370, filed on Jul. 19, 2019.

(51) Int. Cl.
*B60K 17/28* (2006.01)
*F16H 57/022* (2012.01)
*F16H 57/00* (2012.01)

(52) U.S. Cl.
CPC .......... *F16H 57/022* (2013.01); *B60K 17/28* (2013.01); *F16H 57/0006* (2013.01); *F16H 2057/0222* (2013.01)

(58) Field of Classification Search
CPC .. F16H 57/022; F16H 2057/0222; F16H 1/20; F16H 1/26; F16H 57/12; F16H 57/006; F16H 57/028; F16H 2057/127; F16H 1/16; B60K 17/28; B62D 5/0454
See application file for complete search history.

(56) References Cited

U.S. PATENT DOCUMENTS

| | | | |
|---|---|---|---|
| 7,748,288 B2 | 7/2010 | Chevalier et al. | |
| 9,765,873 B2 | 9/2017 | Burrell et al. | |
| 2009/0114045 A1 | 5/2009 | Wilson et al. | |
| 2018/0003286 A1 | 1/2018 | Burrell et al. | |
| 2018/0154927 A1* | 6/2018 | Wilkes | B62D 5/04 |

* cited by examiner

*Primary Examiner* — Randell J Krug
(74) *Attorney, Agent, or Firm* — Daniel L. Boots; Brian W. Chellgren; Dentons Bingham Greenebaum LLP

(57) ABSTRACT

Power takeoff devices (PTOs) are useful for mounting on transmissions and for performing, directly or indirectly, useful work via the mechanical energy generated by the PTO's rotatable output shaft. Systems and methods for reducing PTO gear rattle include a moveable input gear engaging and intermediate to an output gear and a transmission gear. The input gear is carried on an input gear carrier moveable such that the input gear centerline moves along a plane substantially perpendicular to a plane running between the centerlines of the output and transmission gears. The input gear travel is limited by the output and transmission gears such that the input gear is biased to engage at least one of the output gear and the transmission gear, thereby reducing or eliminating gear rattle from overly loose engagement between meshing teeth on the input gear and the transmission gear or output gear.

8 Claims, 4 Drawing Sheets

SYSTEMS AND METHODS FOR ABATEMENT OF GEAR RATTLE BY LINEAR DEFLECTION

CROSS-REFERENCE TO RELATED APPLICATIONS

This application claims the benefit of U.S. provisional patent application Ser. No. 62/876,370 filed Jul. 19, 2019, for SYSTEMS AND METHODS FOR ABATEMENT OF GEAR RATTLE BY LINEAR DEFLECTION, incorporated herein by reference.

FIELD

This present disclosure relates to power takeoff devices (PTOs), which are useful for mounting on transmissions and for performing, directly or indirectly, useful work via the PTO's rotatable output shaft. More specifically, the present disclosure relates to systems and methods for reducing PTO gear rattle.

BACKGROUND

The use of a PTO in association with vehicle (e.g., truck) or stationary engine transmissions is generally known. Such PTOs often include an input gear for connection to an input shaft or transmission, an output gear for connection to an output shaft and, optionally, a clutch mechanism for selectively engaging and disengaging power to the output shaft so as to selectively rotate the output shaft of the PTO to perform useful work, such as to power an auxiliary device of a work truck. Once connected to a gear within the transmission, the input gear of the PTO is connected to and can draw mechanical power from the transmission and can selectively transfer this power to the auxiliary device connected to the PTO.

Mechanical engagement of gears involves engineering challenges, as the distance between the rotational axis of each gear may vary due to differential thermal expansion, manufacturing tolerances, or other reasons commonly known in the industry. Any change in the distance between the rotational axes of engaged gears, however slight, typically creates a corresponding change in the operating clearance or "backlash" between mating or meshing teeth disposed around the perimeter of each gear. Insufficient clearance results in an overly tight meshing of teeth, creating an undesirable "whine" meshing noise and increasing the risk of surface damage and failure. Excessive clearance results in an overly loose meshing of teeth, wherein repeated impacts between spaced apart teeth create an undesirable "rattle" noise and increase the wear on teeth.

The inventors of the present disclosure realized that improvements in gear systems in PTOs are needed to mitigate such undesirable backlash. Certain preferred features of the present disclosure address these and other needs and provide other important advantages.

SUMMARY

Systems and methods for reducing PTO gear rattle include a moveable input gear engaging and intermediate to an output gear and a transmission gear. The input gear is carried on an input gear carrier moveable such that the input gear moves along a plane substantially perpendicular to a plane running between the centerlines of the output and transmission gears. The input gear travel is limited by the output and transmission gears such that the input gear is biased to engage at least one of the output gear and the transmission gear, thereby reducing or eliminating gear rattle from overly loose engagement between meshing teeth on the input gear and the transmission gear or output gear.

This summary is provided to introduce a selection of the concepts that are described in further detail in the detailed description and drawings contained herein. This summary is not intended to identify any primary or essential features of the claimed subject matter. Some or all of the described features may be present in the corresponding independent or dependent claims, but should not be construed to be a limitation unless expressly recited in a particular claim. Each embodiment described herein does not necessarily address every object described herein, and each embodiment does not necessarily include each feature described. Other forms, embodiments, objects, advantages, benefits, features, and aspects of the present disclosure will become apparent to one of skill in the art from the detailed description and drawings contained herein. Moreover, the various apparatuses and methods described in this summary section, as well as elsewhere in this application, can be expressed as a large number of different combinations and subcombinations. All such useful, novel, and inventive combinations and subcombinations are contemplated herein, it being recognized that the explicit expression of each of these combinations is unnecessary.

BRIEF DESCRIPTION OF THE DRAWINGS

Some of the figures shown herein may include dimensions or may have been created from scaled drawings. However, such dimensions, or the relative scaling within a figure, are by way of example only, and are not to be construed as limiting the scope of this invention.

DETAILED DESCRIPTION OF THE ILLUSTRATED EMBODIMENTS

Figure 1:
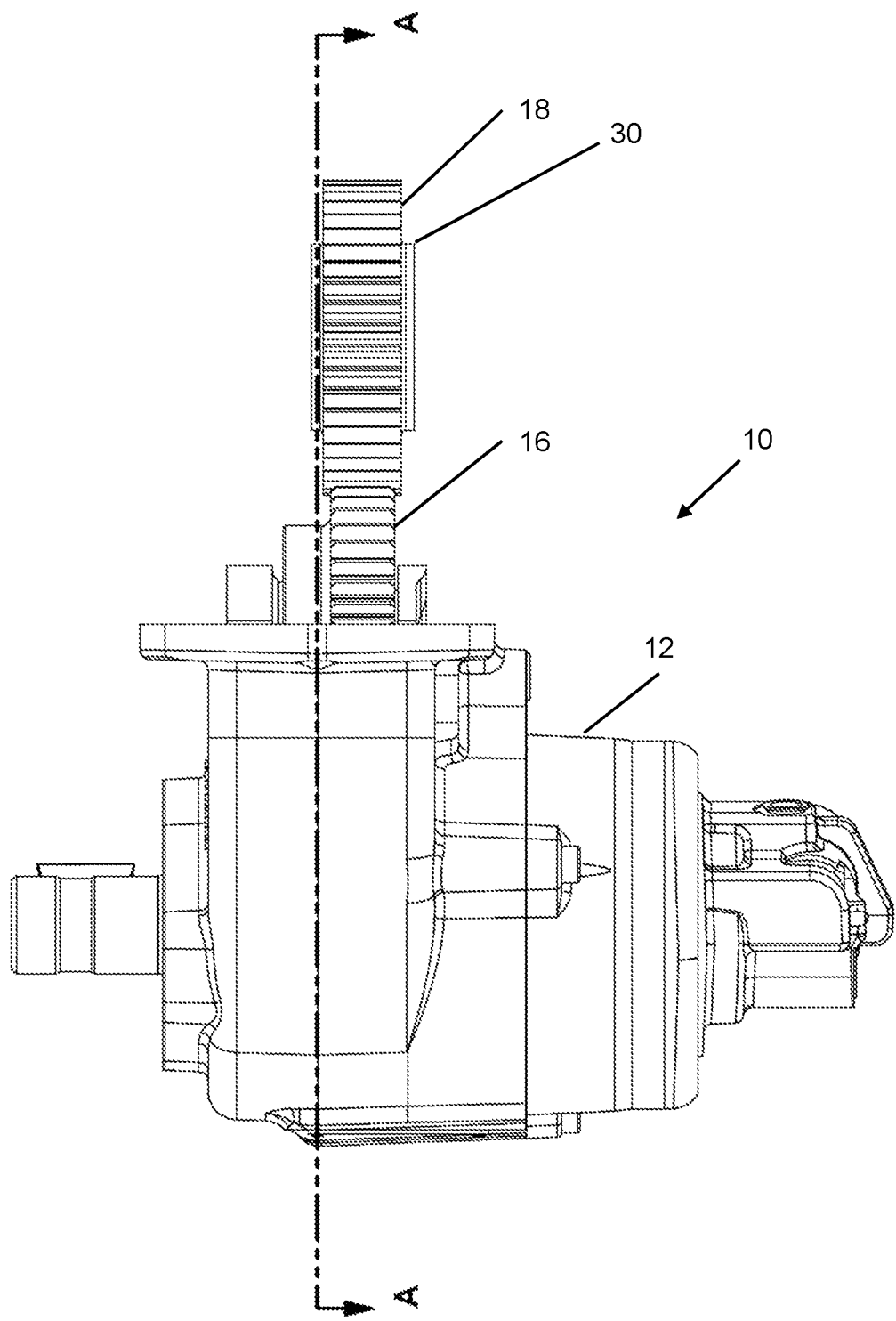
FIG. 1 depicts a top view of a transmission gear engaging a PTO according to a first embodiment of the present invention.

For the purposes of promoting an understanding of the principles of the invention disclosed herein, reference will now be made to one or more embodiments, which may or may not be illustrated in the drawings, and specific language will be used to describe the same. It will nevertheless be understood that no limitation of the scope of the disclosure is thereby intended; any alterations and further modifications of the described or illustrated embodiments, and any further applications of the principles of the disclosure as illustrated herein are contemplated as would normally occur to one skilled in the art to which the disclosure relates. At least one embodiment of the disclosure is shown in great detail, although it will be apparent to those skilled in the relevant art that some features or some combinations of features may not be shown for the sake of clarity.

Any reference to "invention" within this document is a reference to an embodiment of a family of inventions, with no single embodiment including features that are necessarily included in all embodiments, unless otherwise stated. Furthermore, although there may be references to benefits or advantages provided by some embodiments, other embodiments may not include those same benefits or advantages, or may include different benefits or advantages. Any benefits or advantages described herein are not to be construed as limiting to any of the claims.

Specific quantities (spatial dimensions, temperatures, pressures, times, force, resistance, current, voltage, concentrations, wavelengths, frequencies, heat transfer coefficients, dimensionless parameters, etc.) may be used explicitly or implicitly herein; such specific quantities are presented as examples only and are approximate values unless otherwise indicated. Discussions pertaining to specific compositions of matter, if present, are presented as examples only and do not limit the applicability of other compositions of matter, especially other compositions of matter with similar properties, unless otherwise indicated.

Reference systems that may be used herein can refer generally to various directions (e.g., top, bottom, leftward, rightward, forward and rearward), which are merely offered to assist the reader in understanding the various embodiments of the disclosure and are not to be interpreted as limiting. It should be understood that the disclosed PTO housing may be mounted at different locations and different orientations with respect to different engines and transmissions. Other reference systems may be used to describe various embodiments.

Embodiments of the present invention include a gear system for a PTO configured to reduce or eliminate gear rattle by maintaining a preferred clearance between mating teeth in an input gear and transmission gear and output gear engaged therewith.

Depicted in FIGS. 1-4 is a PTO 10 according to a first embodiment of the present invention. The PTO 10 includes a housing 12, an output gear 14 and an input gear 16. The input gear 16 is located between and engages both the output gear 14 and a transmission gear 18. Each of the output gear 14, input gear 16 and transmission gear 18 include a plurality of teeth 20, 22, and 24, respectively, disposed about the perimeter of the gear. The teeth 22 of the input gear 16 are in meshing engagement with the teeth 24 of the transmission gear 18 and with the teeth 20 of the output gear 14 such that the three gears are rotationally coupled. The PTO 10 is configured to accept rotational power input from the transmission gear 18 by engaging it with the input gear 16. Rotational power is transferred from the input gear 16 to the output gear 14, then delivered to an output shaft (not shown) connected to the output gear 14 to perform useful work, such as to power an auxiliary device.

The output gear 14 is mounted on a fixed axle 26 attached to the PTO housing 12 such that the output gear 14 rotates about a fixed rotational axis 28. The transmission gear 18 is also mounted on a fixed axle 30 such that the transmission gear rotates about a fixed rotational axis 32. The input gear 16 is mounted on an axle 34 carried on a moveable input gear carriage means such as carrier 36 such that the input gear rotates about a moveable rotational axis 33.

The PTO housing 12 further includes an opening 38 providing access to an interior 40 of the PTO housing 12. The output gear 14 is located within the interior 40 and the input gear 16 is located at least partially within the interior 40. In the depicted embodiment, the input gear carrier 36 extends across the opening 38 along a plane defined by the opening 38. Opposing first end 42 and second end 43 of the carrier 36 are attached to the interior 40 of the PTO housing 12 via one or more biasing mechanisms, such as springs 44, positioned between the carrier 36 and the PTO housing 12.

Figure 2:
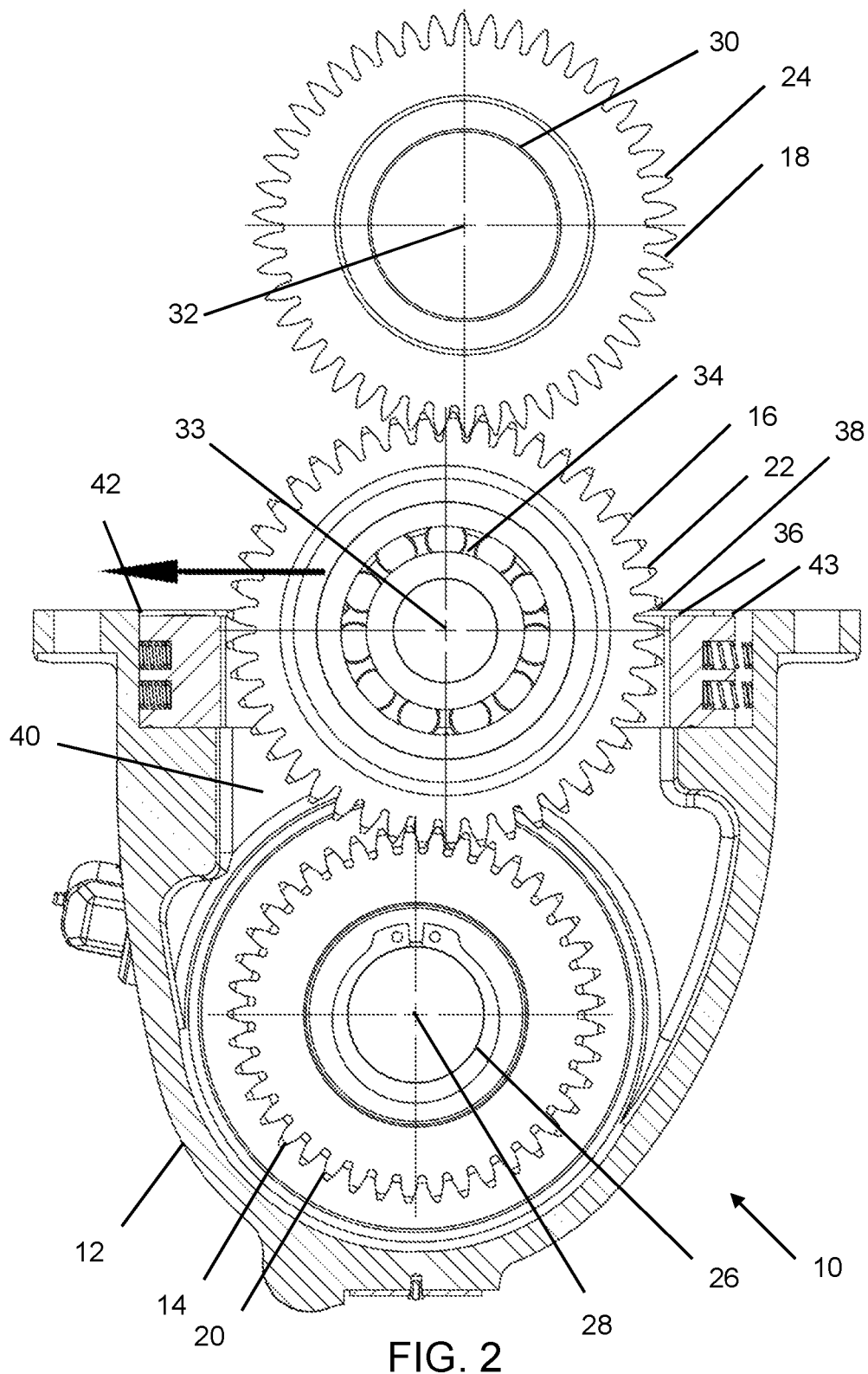
FIG. 2 depicts a side cross-sectional view along lines A-A of FIG. 1 with the input gear in a first position.
Figure 3:
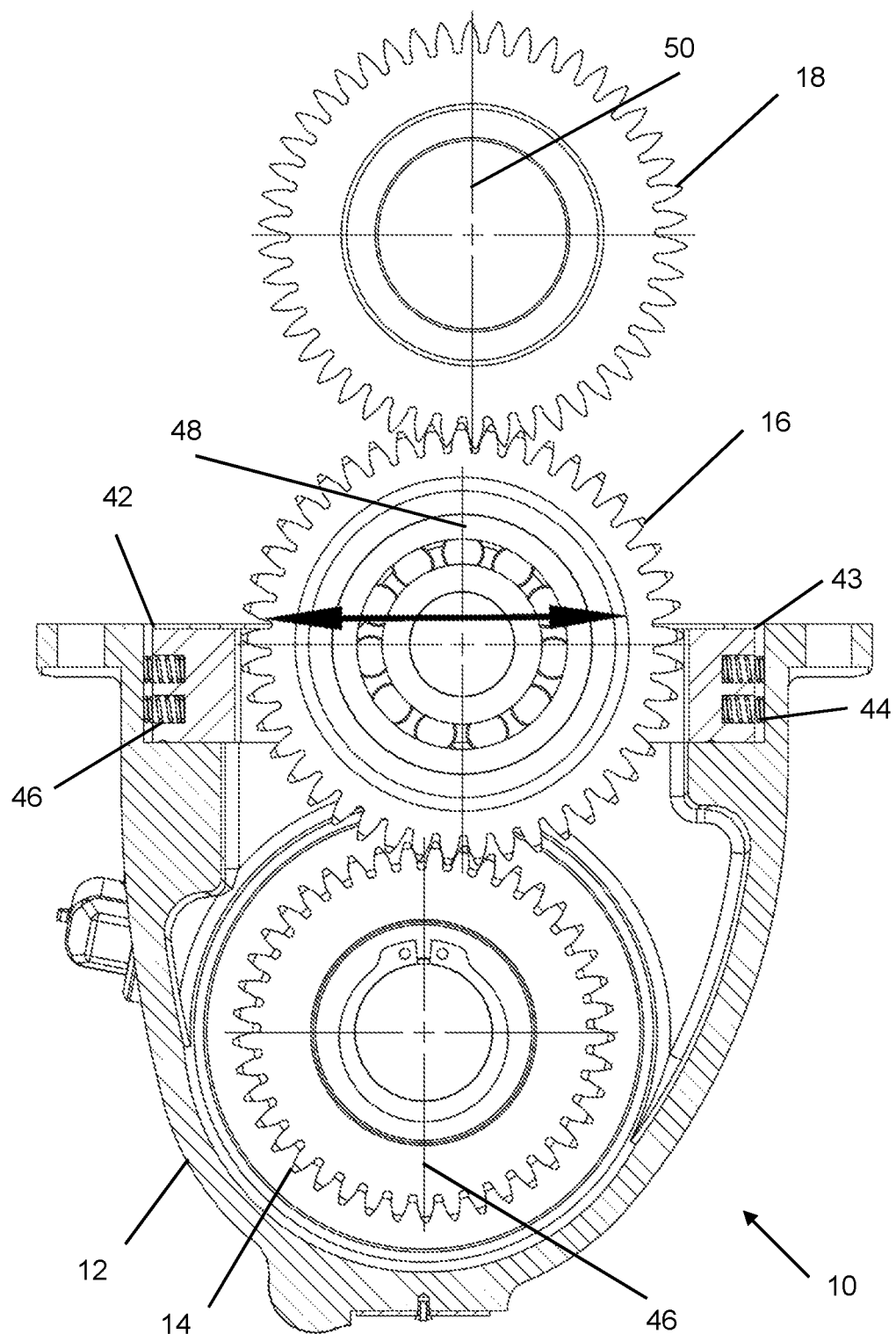
FIG. 3 depicts a side cross-sectional view along lines A-A of FIG. 1 with the input gear in a second position.
Figure 4:
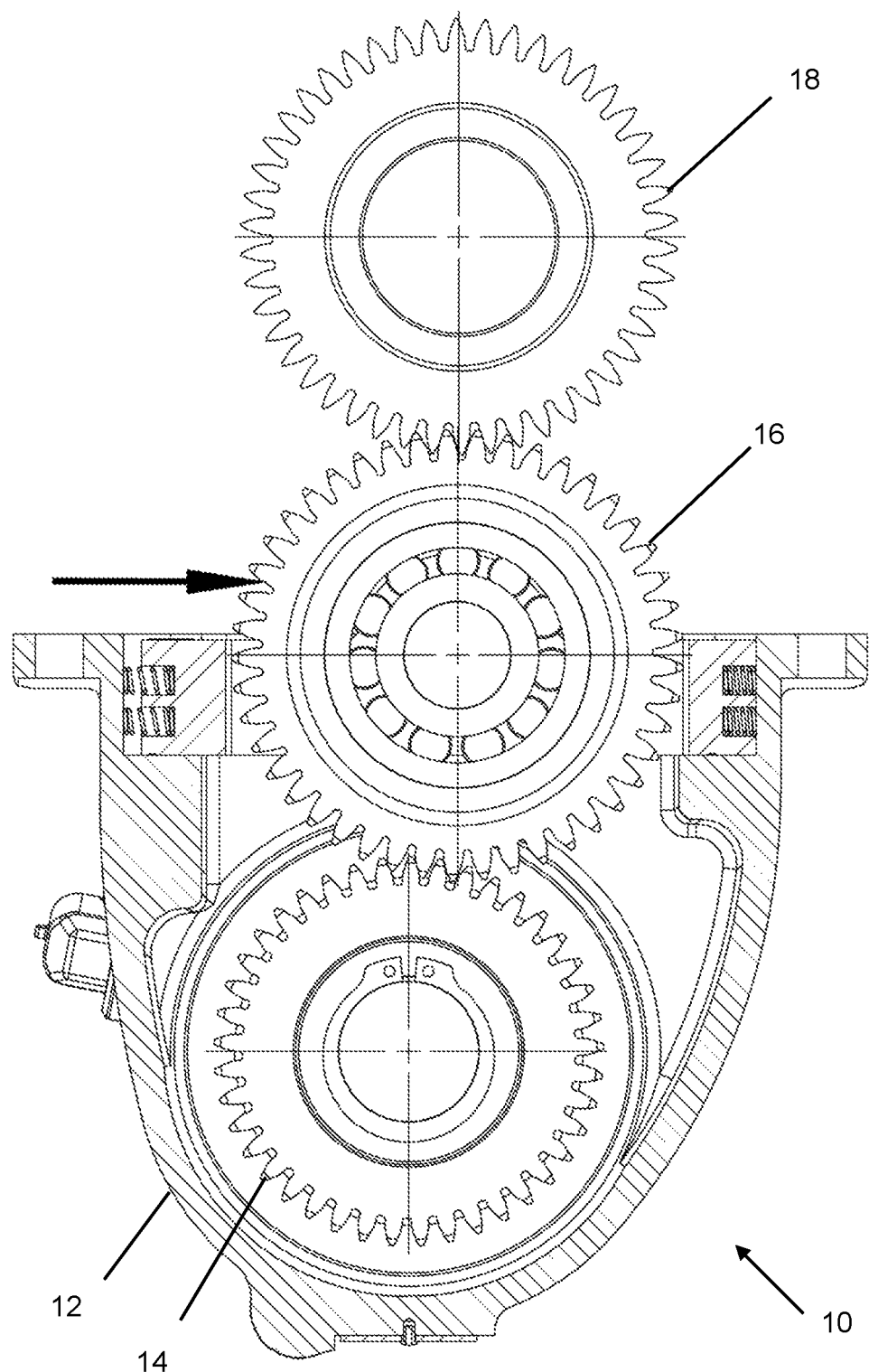
FIG. 4 depicts a side cross-sectional view along lines A-A of FIG. 1 with the input gear in a third position.

In some embodiments, as shown in FIG. 3, the ends 42, 43 each include a cavity 46 wherein the springs 44 are each located at least partially within the cavities 46 and extend from the cavities 46 in the direction of the PTO housing 12. While FIGS. 2, 3, and 4 show two sets of springs 44, each in their own cavity 46, in each of the first end 42 and second end 43, it should be understood that different configurations of springs (e.g., 1, 2, 3, or more springs) and cavities (e.g., 1 spring per cavity, 2 springs sharing the same cavity, etc.) are within the scope of this invention. Furthermore, the biasing mechanism may be coil springs, torsion springs, leaf springs, opposing magnets, or other biasing mechanisms as known in the art. While FIGS. 2, 3, and 4 show cavities 46 in the ends 42, 43 of the carrier 36, in other embodiments, the cavities may be formed in the PTO housing itself.

The springs 44 are configured to allow the input gear carrier 36 to move in a linear path having a single degree of freedom (shown by large arrows in FIGS. 2, 3 and 4) substantially parallel to the opening 38 and substantially perpendicular to the vertical centerlines 46, 48, and 50, of the output gear 14, input gear 16, and transmission gear 18, respectively. It should be understood that the term "vertical centerline" is used in reference to FIGS. 2, 3, and 4 and that the PTO 10 could be mounted on a transmission in various orientations such that vertical centerlines 46, 48, and 50 could be arranged in non-vertical orientations. Regardless of orientation, vertical centerlines 46, 48, and 50 are parallel but not in-line (i.e., not collinear), such that linear movement of the input gear carrier 36 perpendicular to the vertical centerlines 46, 48, 50 changes the distance between the respective center points of input gear 16 and output gear 14 and transmission gear 18. Springs 44 bias the input gear carrier 36 to a second position centered within the opening 40, as best shown in FIG. 3, maintaining engagement between the respective teeth 20, 22, 24 of input gear 16 and at least one of the output gear 14 and transmission gear 18, to reduce gear rattle and absorb vibration from the transmission gear 18.

Referring to FIG. 2, clockwise rotation of the transmission gear 18 would apply a torque in the direction of the first end 42 (i.e., leftwards, as shown by the large arrow) to the input gear 16, moving the carrier 36 to a first position, such that springs 44 on the first end 42 are compressed and fit substantially entirely within their respective cavities 46, such that the first end 42 of the carrier 36 abuts the PTO housing 12, while springs 44 on the second end 43 are disposed in an extended position.

Referring to FIG. 4, counter-clockwise rotation of the transmission gear 18 would apply a torque in the direction of the second end 43 (i.e., rightwards, as shown by the large arrow) to the input gear 16, moving the carrier 36 to a third position, such that springs 44 on the second end 43 are compressed and fit substantially entirely within their respective cavities 46, such that the second end 43 of the carrier 36 abuts the PTO housing 12, while springs 44 on the first end 42 are disposed in an extended position.

Mechanical rotational power from the transmission gear 18 causes the input gear carrier 36 to move linearly in a direction perpendicular to their respective centerlines 50, 48 to physically contact the PTO housing 12, whereby the mechanical rotational power is transferred from the transmission gear 18, to the input gear 16, to the output gear 14 to perform useful work. When mechanical rotational power is not applied from transmission gear 18, as typically occurs when the PTO clutch is disengaged and there is no load on the PTO, springs 44 bias the input gear carrier 36 to a centered position (shown best in FIG. 3) such that teeth 22 of input gear 16 mesh snugly with teeth 20, 24 of at least one of the output gear 14 and transmission gear 18, thereby reducing or eliminating excessive backlash and the undesirable gear rattle associated therewith.

Various aspects of different embodiments of the present disclosure are expressed in paragraphs X1, X2, and X3 as follows:

X1. One embodiment of the present disclosure includes a gear system for a power takeoff, comprising: an output gear having a fixed rotational axis; a moveable input gear carrier; and an input gear carried on the input gear carrier, the input gear configured to engage the output gear and a transmission gear having a rotational axis, the input gear having a rotational axis; wherein the input gear carrier is moveable such that the input gear rotational axis moves along a plane substantially perpendicular to a plane extending between the rotational axis of the output gear and the rotational axis of the transmission gear.

X2. Another embodiment of the present disclosure includes a power takeoff comprising: a housing including an opening; an output gear positioned within the housing; an input gear positioned partially within the housing and partially external to the housing through the opening; and an input gear carrier linearly moveable along a plane defined by the opening, wherein the input gear is positioned on the input gear carrier.

X3. A further embodiment of the present disclosure includes a method for reducing gear rattle comprising: providing a power takeoff including a housing having an opening, an output gear, and an input gear rotationally engaging the output gear, the input gear extending through the opening and being carried on a moveable input gear carrier; providing a biasing mechanism positioned between the housing and the input gear carrier; biasing the input gear carrier to remain substantially centered in the opening by biasing the input gear carrier away from the housing using the biasing mechanism.

Yet other embodiments include the features described in any of the previous statements X1, X2, or X3, as combined with one or more of the following features:

Wherein the input gear rotational axis moves along a plane substantially perpendicular, but not exactly perpendicular, to a plane extending between the rotational axis of the output gear and the rotational axis of the transmission gear.

A PTO housing including an interior, wherein the output gear is positioned within the interior and wherein the input gear is positioned at least partially within the interior.

A PTO housing including an opening, wherein the moveable input gear carrier is positioned within the opening.

Wherein movement of the input gear carrier is restricted by contact between the input gear carrier and the PTO housing.

A biasing mechanism positioned between the input gear carrier and the PTO housing.

Wherein the biasing mechanism is at least one spring.

Wherein the biasing mechanism includes a plurality of springs.

Wherein the input gear carrier includes opposing first and second ends, and wherein the biasing mechanism is positioned between the first end and the PTO housing and between the second end and the PTO housing.

Wherein the input gear carrier includes opposing first and second ends, and wherein the biasing mechanism is positioned between the first end and the housing and between the second end and the housing.

Wherein the biasing mechanism biases the input gear carrier away from the housing.

Wherein the biasing mechanism biases the first end away from the housing and wherein the biasing mechanism biases the second end away from the housing, such that the input gear carrier is biased to remain substantially centered within the opening.

Wherein at least one of the input gear carrier and PTO housing include a cavity and wherein the biasing mechanism is positioned at least partially within the cavity.

Wherein at least one of the input gear carrier and the housing include a cavity and wherein the biasing mechanism is positioned at least partially within the cavity.

Wherein the biasing mechanism biases the input gear carrier away from the PTO housing.

Wherein the movable input gear carrier has a single degree of freedom in movement.

Wherein the single degree of freedom in movement comprises movement along a straight, uncurved line.

Wherein the output gear, input gear, and transmission gear each include parallel but non-collinear centerlines, such that linear movement of the input gear carrier perpendicular to the centerlines changes the distance between the input gear and the output gear and between the input gear and the transmission gear.

Wherein movement of the input gear carrier is restricted by contact between the input gear carrier and the housing.

Wherein the input gear is configured to engage the output gear and a transmission gear having a rotational axis; and wherein the input gear carrier is moveable such that a rotational axis of the input gear moves along a plane substantially perpendicular to a plane extending between a rotational axis of the output gear and the rotational axis of the transmission gear.

Wherein application of mechanical rotational power from the transmission gear to the input gear sufficient to overcome the biasing mechanism moves the input gear carrier to contact the housing.

While examples, one or more representative embodiments, and specific forms of the disclosure, have been illustrated and described in detail in the drawings and foregoing description, the same is to be considered as illustrative and not restrictive or limiting. The description of particular features in one embodiment does not imply that those particular features are necessarily limited to that one embodiment. Some or all of the features of one embodiment can be used in combination with some or all of the features of other embodiments as would be understood by one of ordinary skill in the art, whether or not explicitly described as such. One or more exemplary embodiments have been shown and described, and all changes and modifications that come within the spirit of the disclosure are desired to be protected.

The invention claimed is:

1. A power takeoff comprising:
a housing including an opening;
an output gear positioned within the housing;
an input gear positioned partially within the housing and partially external to the housing through the opening;
an input gear carrier linearly moveable along a plane defined by the opening, wherein the input gear is positioned on the input gear carrier; and
a biasing mechanism positioned between the input gear carrier and the housing;
wherein the input gear carrier includes opposing first and second ends, and wherein the biasing mechanism is positioned between the first end and the housing and between the second end and the housing.

2. The power takeoff of claim 1, wherein the biasing mechanism biases the first end away from the housing and wherein the biasing mechanism biases the second end away from the housing, such that the input gear carrier is biased to remain substantially centered within the opening.

3. The power takeoff of claim 1, wherein the biasing mechanism biases the input gear carrier away from the housing.

4. The power takeoff of claim 1, wherein movement of the input gear carrier is restricted by contact between the input gear carrier and the housing.

5. The power takeoff of claim 1, wherein at least one of the input gear carrier and the housing include a cavity and wherein the biasing mechanism is positioned at least partially within the cavity.

6. A method for reducing gear rattle comprising:
providing a power takeoff according to claim 1; and
biasing the input gear carrier to remain substantially centered in the opening by biasing the input gear carrier away from the housing using the biasing mechanism.

7. The method of claim 6, wherein the input gear is configured to engage the output gear and a transmission gear having a rotational axis; and
wherein the input gear carrier is moveable such that a rotational axis of the input gear moves along a plane defined by the opening.

8. The method of claim 7, wherein application of mechanical rotational power from the transmission gear to the input gear sufficient to overcome the biasing mechanism moves the input gear carrier to contact the housing.

* * * * *